United States Patent
Dobek et al.

(10) Patent No.: US 7,984,911 B2
(45) Date of Patent: Jul. 26, 2011

(54) FACE SEAL FOR GAS TURBINE ENGINE

(75) Inventors: Louis J. Dobek, Somers, CT (US);
Masayoshi Sonokawa, West Hartford, CT (US); Harold K. Shaffer, Tolland, CT (US); Mark Story, Kutztown, PA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/472,553

(22) Filed: May 27, 2009

(65) Prior Publication Data
US 2009/0230628 A1      Sep. 17, 2009

Related U.S. Application Data

(63) Continuation-in-part of application No. 12/015,715, filed on Jan. 17, 2008.

(51) Int. Cl.
*F16J 15/34* (2006.01)
(52) U.S. Cl. ..................................... 277/399
(58) Field of Classification Search .................. 277/370, 277/397, 399, 400
See application file for complete search history.

(56) References Cited

U.S. PATENT DOCUMENTS

| | | | |
|---|---|---|---|
| 3,915,521 A | | 10/1975 | Young |
| 4,026,564 A | * | 5/1977 | Metcalfe ................. 277/397 |
| 4,087,100 A | * | 5/1978 | Yoshihashi et al. ......... 277/399 |
| 4,142,731 A | * | 3/1979 | Filippov et al. ............ 277/399 |
| 4,406,459 A | | 9/1983 | Davis et al. |
| 4,407,512 A | * | 10/1983 | Trytek ................... 277/400 |
| 5,088,890 A | | 2/1992 | Jewess |
| 5,464,227 A | | 11/1995 | Olson |
| 5,501,471 A | | 3/1996 | Ohba et al. |
| 6,131,914 A | | 10/2000 | Proveaux |
| 6,676,369 B2 | | 1/2004 | Brauer et al. |
| 6,758,477 B2 | | 7/2004 | Brauer et al. |
| 7,225,626 B2 | | 6/2007 | Robinson et al. |
| 2005/0206088 A1 | | 9/2005 | Anderson et al. |
| 2007/0025835 A1 | | 2/2007 | Gockel et al. |

FOREIGN PATENT DOCUMENTS
GB             2 285 101            6/1995
* cited by examiner

*Primary Examiner* — Vishal Patel
(74) *Attorney, Agent, or Firm* — Carlson, Gaskey & Olds PC

(57) ABSTRACT

A face seal for a gas turbine engine comprises a seal body that has a contact face to engage a rotating surface. The contact face is defined as an area extending radially between an inner diameter of the seal body and an outer diameter of the seal body at one seal end providing a radial width. The radial width is between greater than 0.15 inch (3.81 mm).

12 Claims, 3 Drawing Sheets

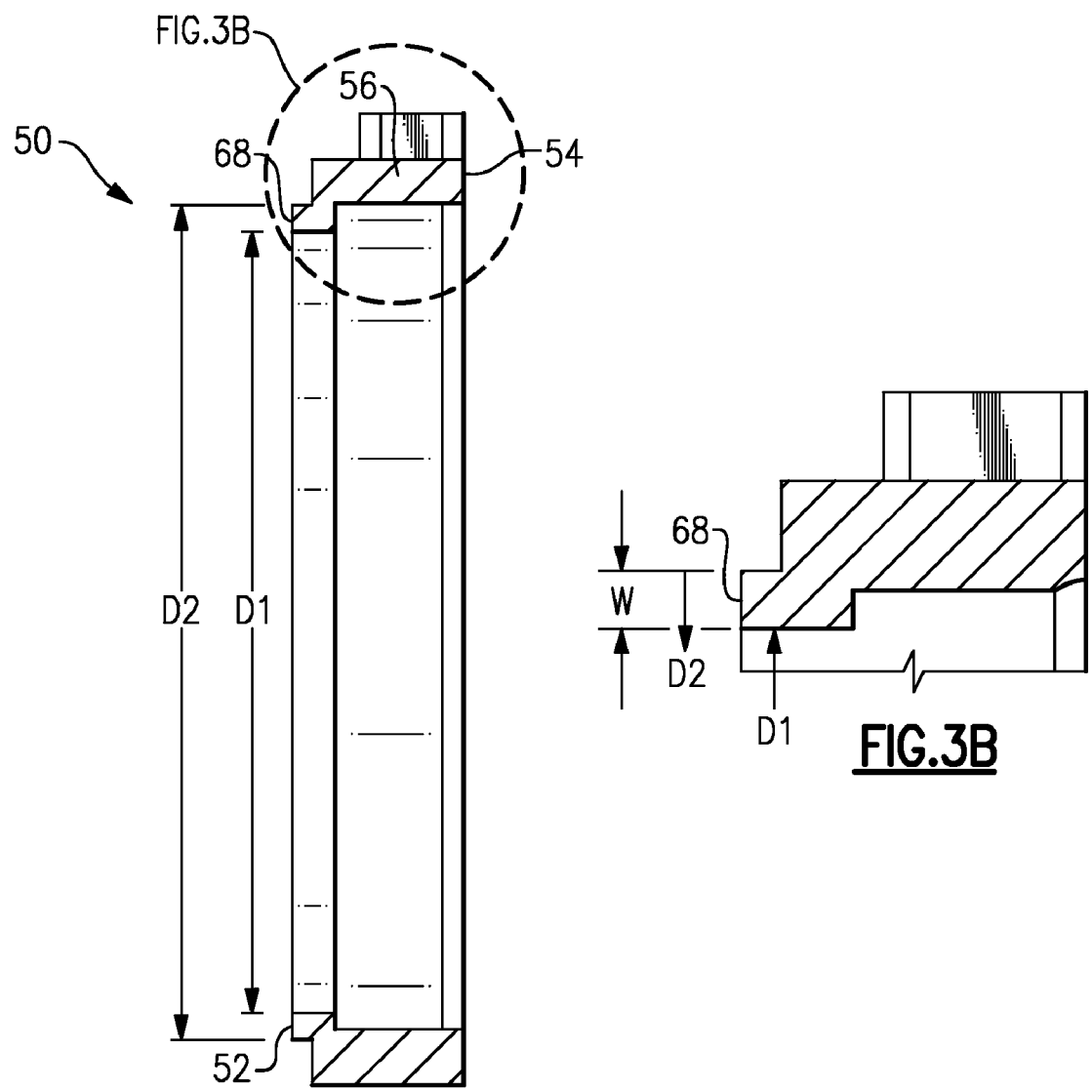

FACE SEAL FOR GAS TURBINE ENGINE

This disclosure is a continuation-in-part application of U.S. Ser. No. 12/015,715, filed on Jan. 17, 2008.

BACKGROUND OF THE INVENTION

This disclosure relates to a face seal for a gas turbine engine.

A face seal that is installed within an engine bearing compartment extends between first and second seal end faces. One of the seal end faces contacts a rotating seal face plate. The seal face plate is mounted for rotation with a rotor shaft. The end face that contacts the seal face plate is referred to as the "nose."

Future aircraft engine products require cycles that have significantly higher rotor speeds than traditionally defined cycles. Higher rotor speeds accordingly result in higher bearing compartment seal rubbing speeds. Traditionally, to reduce friction and wear, the width of the nose has been minimized as much as possible. In one known configuration, the industry calls for nose widths to be 0.150 inches (0.381 centimeters) or less.

In the past, improved carbon materials have been used to increase seal wear life. However, current carbon materials do not provide the desired wear life for future higher rotor speed requirements.

Accordingly, there is a need to provide an improved face seal that can provide a desired seal wear life at high rotor speeds, as well as addressing the other short comings discussed above.

SUMMARY OF THE INVENTION

A face seal for a gas turbine engine comprises a seal body that has a contact face to engage a rotating surface. The contact face is defined as an area extending radially between an inner diameter of the seal body and an outer diameter of the seal body at one seal end providing a radial width. The radial width is greater than 0.15 inches (3.81 mm).

In one example, a seal face plate is supported for rotation relative to a non-rotating engine structure. The seal body has a central bore extending between first and second seal end faces. One of the first and second seal end faces comprises the contact face that engages the seal face plate. A resilient member exerts a load against the other of the first and second seal end faces to press the contact face against the seal face plate.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3A is a cross-sectional view of an example face seal.

FIG. 3B is a magnified view of a portion of the example face seal as indicated in FIG. 3A.

DETAILED DESCRIPTION OF THE PREFERRED EMBODIMENT

Figure 1:
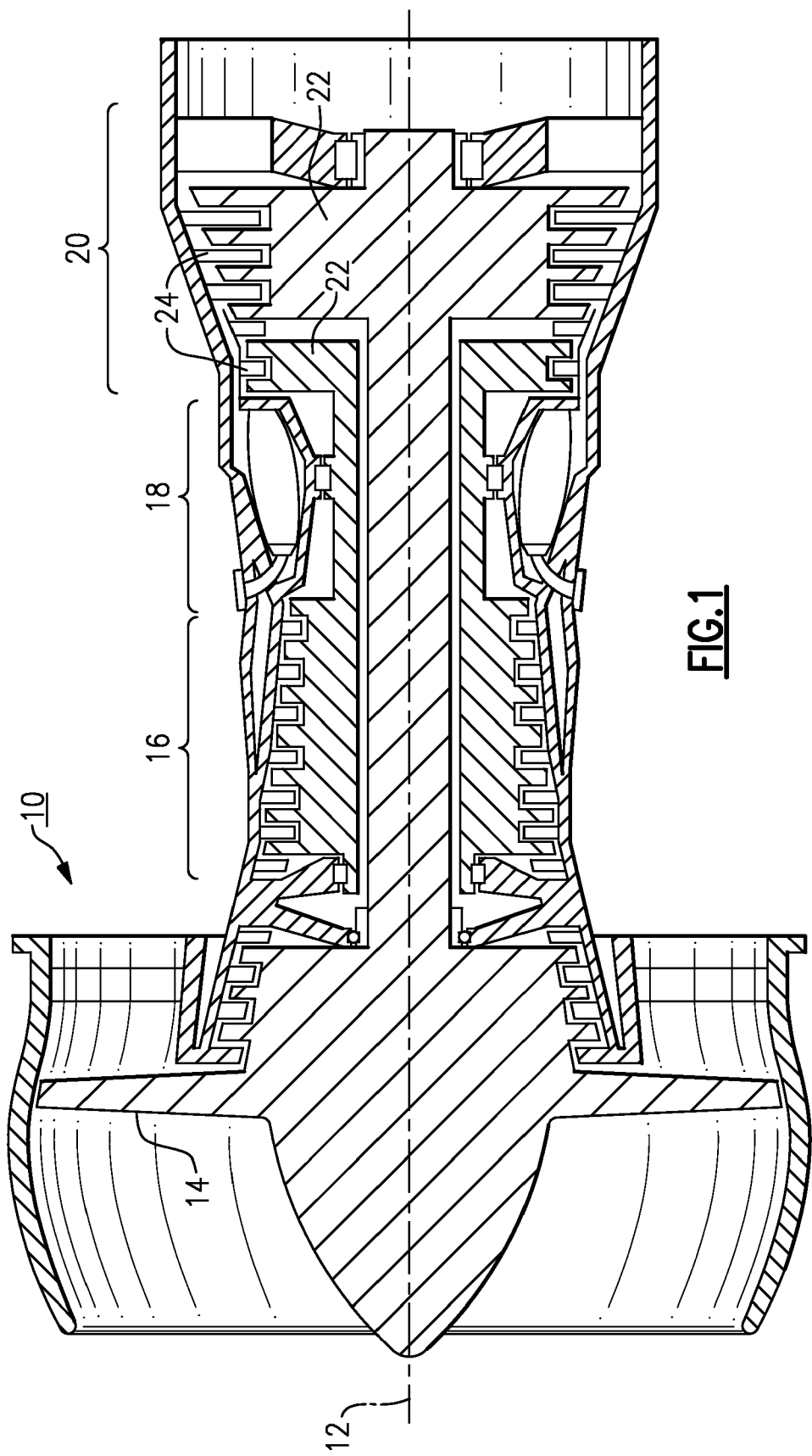
FIG. 1 is a highly schematic view of a cross-section of a gas turbine engine.

FIG. 1 illustrates selected portions of an example gas turbine engine 10, such as a turbofan gas turbine engine used for propulsion. In this example, the turbine engine 10 is circumferentially disposed about an engine centerline 12. The turbine engine 10 includes a fan 14, a compressor section 16, a combustion section 18, and a turbine section 20. The combustion section 18 and the turbine section 20 include corresponding blades 22 and vanes 24. As is known, air compressed in the compressor section 16 is mixed with fuel and burned in the combustion section 18 to produce hot gasses that are expanded in the turbine section 20.

FIG. 1 is a somewhat schematic presentation for illustrative purposes only and is not a limitation on the disclosed examples. Additionally, there are various types of gas turbine engines, many of which could benefit from the examples disclosed herein and are not limited to the designs shown. For example, a gas turbine engine may contain a reduction gearbox disposed between the turbine section 20 and the fan 14, allowing the fan 14 to turn at a different speed than the turbine.

Figure 2:
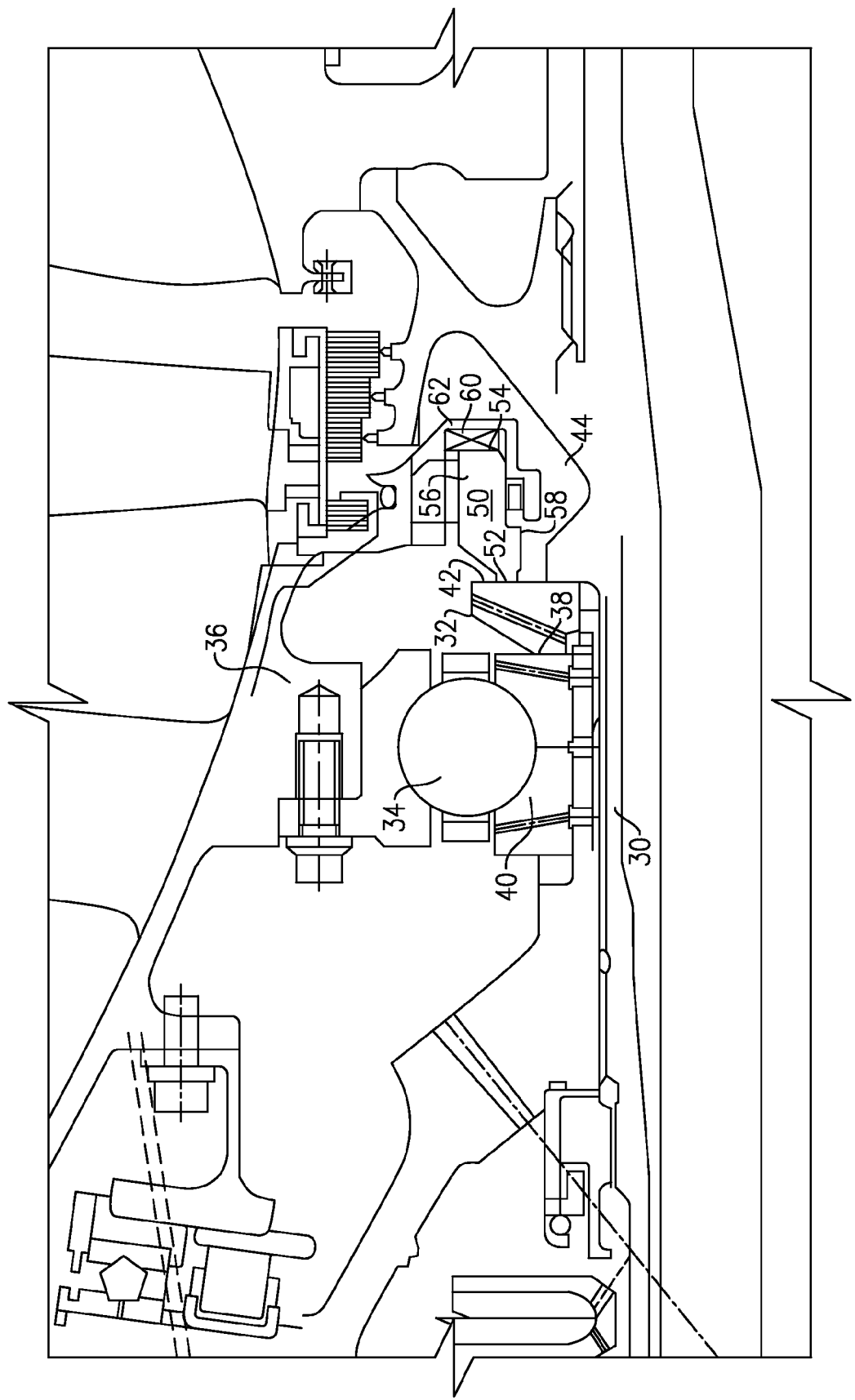
FIG. 2 is a schematic view of a partial cross-section of a shaft, bearing, and face seal.

FIG. 2 illustrates a rotating component 30 that is rotatable about an axis defined by the engine centerline 12 (FIG. 1). A seal face plate 32 also mounted for rotation about the axis. A bearing 34 supports the rotating component 30 for rotation relative to a non-rotating engine structure 36. The seal face plate 32 has a fore face 38 that engages an inner face 40 of the bearing 34 and an aft face 42 that faces a high pressure area 44 of the gas turbine engine 10.

An annular face seal 50 is positioned within this high pressure area 44 and includes a first seal end face 52 that engages the aft face 42 of the seal face plate 32 and a second seal end face 54 that faces opposite of the first seal end face 52. It should be understood that only the upper cross-section of bearing 34, seal face plate 32, and face seal 50 are shown in FIG. 2, with the lower cross-section being similarly configured to that of the upper cross-section as these components extend around the axis.

The face seal 50 includes a seal body 56 with a central bore 58 that surrounds the axis. The face seal 50 is made from a carbon based material as known. The seal body 56 extends axially between the first 52 and second 54 seal end faces in a direction that is generally parallel to the axis. A resilient member, such as a load spring 60 for example, is used to exert a spring force against the second seal end face 54. The load spring 60 is supported by a non-rotating component 62 that has one portion that is spaced axially aft of the second seal end face 54 and another portion which extends into the central bore 58. The load spring 60 applies an axial spring force to push the first seal end face 52 into direct contact with the aft face 42 of the seal face plate 32.

As such, the first seal end face 52 comprises an annular contact face 68 (FIG. 3) having a radial width W that engages a rotating component, i.e. the seal face plate 32. The contact face 68 is defined as a nose area extending radially between an inner diameter D1 of the seal body 56 and an outer diameter D2 of the seal body 56.

In one example, a ratio of the outer diameter D2 to the inner diameter D1 is at least 1.054. In another example, the ratio is greater than 1.060. In yet another example, the ratio is between 1.060 and 1.071.

In one example, the inner diameter D1 of the seal body 56 is less than 5.734 inches (14.564 centimeters) and the outer diameter is greater than 6.038 inches (15.337 centimeters). In another example, the width W of the annular contact face is greater than 0.15 inch (3.81 mm). In one example, the width W is approximately 0.25 inch (6.35 mm). In one example, the width W is approximately 0.20 inch. In one example, the width W is approximately 0.30 inch. As such, the contact area between the face seal 50 and the seal face plate 32 has increased up to at least 50% compared to prior configurations. This contact area increase of approximately 50% impacts the tribology of corresponding mating surfaces of the face seal 50 and the seal face plate 32 such that the resulting carbon wear performance is greatly improved by providing a significant reduction in the seal face wear rate. A significant increase in seal wear life is provided with minimal cost impact.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A face seal for a gas turbine engine comprising:
   a seal body having an annular contact face arranged about an axis and configured to engage a rotating surface wherein the contact face defines a radial width of the annular contact face extending radially between an inner diameter of the seal body and an outer diameter of the seal body at one seal end, wherein the radial width is greater than 0.15 inch (3.81 mm) and approximately 0.30 inch (7.62 mm), and a ratio of the outer diameter to the inner diameter is between 1.054-1.071.

2. The face seal according to claim 1 wherein the radial width is approximately 0.20 inch (5.08 mm).

3. The face seal according to claim 1 wherein the radial width is approximately 0.30 inch (7.62 mm).

4. The face seal according to claim 1 wherein the radial width is approximately 0.25 inch (6.35 mm).

5. The face seal according to claim 1 wherein the seal body is comprised of a carbon based material.

6. The face seal according to claim 1, wherein the inner diameter is less than 5.734 inches (14.564 cm), and the outer diameter is greater than 6.038 inches (15.337 cm).

7. A face seal assembly for a gas turbine engine comprising:
   a seal face plate supported for rotation relative to a non-rotating engine structure;
   a seal body having a central bore extend between first and second seal end faces wherein one of the first and the second seal end faces comprises an annular contact face that engages said seal face plate, with the annular contact face defines a radial width of the annular contact face extending radially between an inner diameter of the seal body and an outer diameter of the seal body, and wherein the radial width is greater than 0.15 inch (3.81 mm) and approximately 0.30 inch (7.62 mm), a ratio of the outer diameter to the inner diameter is between 1.054-1.071; and
   a resilient member exerting a load against the other of the first and second seal end faces to press the contact face against the seal face plate.

8. The face seal assembly according to claim 7 wherein the radial width is approximately 0.20 inch (5.08 mm).

9. The face seal assembly according to claim 7 wherein the radial width is approximately 0.30 inch (7.62 mm).

10. The face seal assembly according to claim 7 wherein the radial width is approximately 0.25 inch (6.35 mm).

11. The face seal assembly according to claim 7 wherein said seal body is comprised of a carbon based material.

12. The face seal assembly according to claim 7, wherein the inner diameter is less than 5.734 inches (14.564 cm), and the outer diameter is greater than 6.038 inches (15.337 cm).

* * * * *